J. H. WILSON.
SLEEVE PULLER.
APPLICATION FILED APR. 22, 1920.

1,384,289.

Patented July 12, 1921.

INVENTOR
Joseph H. Wilson
BY
Hardway & Cathey
ATTORNEYS.

UNITED STATES PATENT OFFICE.

JOSEPH H. WILSON, OF HOUSTON, TEXAS.

SLEEVE-PULLER.

1,384,289.

Specification of Letters Patent. Patented July 12, 1921.

Application filed April 22, 1920. Serial No. 375,733.

*To all whom it may concern:*

Be it known that I, JOSEPH H. WILSON, a citizen of the United States, residing at Houston, in the county of Harris and State of Texas, have invented certain new and useful Improvements in Sleeve-Pullers, of which the following is a specification.

This invention relates to new and useful improvements in a sleeve puller.

One object of the invention is to provide a device of the character described which has been designed particularly for the purpose of pulling sleeves from the rear axle housing of a motor vehicle; but the device may be used for other similar purposes.

Another object of the invention is to produce a sleeve puller which is of simple construction and operation and which may be easily and cheaply manufactured and kept in repair.

Figure 1:
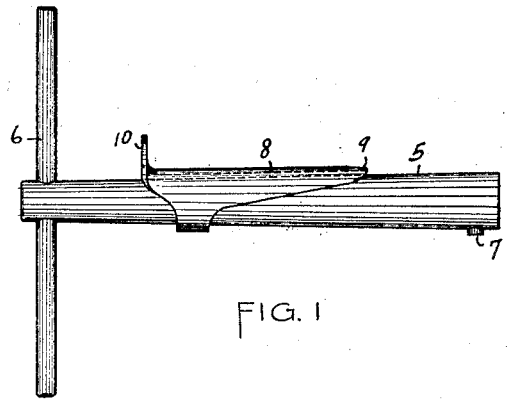
Figure 2:
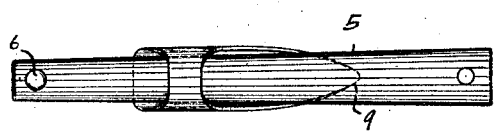
Figure 3:
Figure 4:
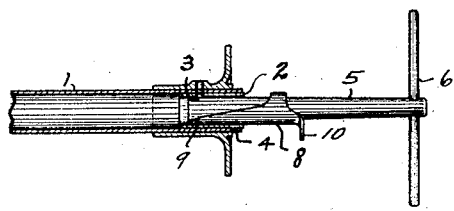
Figure 5:
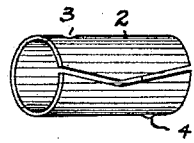

With the above and other objects in view, the invention has particular relation to certain novel features of construction, operation and arrangement of parts, an example of which is given in this specification and illustrated in the accompanying drawings, wherein, Figure 1 is a side view of the device, Fig. 2 is also a side view taken at right angles to the view shown in Fig. 1, Fig. 3 is an end view, Fig. 4 is a side view as applied to the work and Fig. 5 is a perspective view of the sleeve to be pulled.

Referring now more particularly to the drawings wherein like numerals of reference designate similar parts in each of the figures, the numeral 1 refers to an axle housing provided to receive the rear axle of a motor vehicle. This housing has sleeves as 2 therein forming an outer surface against which the bearings operate. This sleeve has a lubricant port 3 therein provided to permit lubrication of the bearings and also has a peripheral knob 4 which fits in a corresponding depression in the housing to retain the sleeve in place. The numeral 5 refers to a tubular member, one end of which carries the handle 6 and the other end of which has the outwardly projecting stud 7. Said member 5 has a slight flare or taper from the handle to its free end. A sleeve like wedge 8 is slidably mounted on the member 5, one end of which is formed into a point 9 and the other end of which is turned outwardly, forming the grip 10.

In application the member 5 is inserted into the sleeve, and if the axle is within the housing, its outer end will project into said member 5. The stud 7 is then engaged into the port 3 and the wedge 8 is forced inwardly into the sleeve, thus wedging the member 5 tightly within the sleeve so as to prevent the disengagement of the stud 7 from the port 3. The handle 6 is then grasped and the entire device is partially turned to unseat the knob 4 from its depression. It is to be observed that the sleeve 2 is split, as shown in Fig. 5 and is thus yieldable which will permit the unseating of said knob. The sleeve may be then readily pulled out by a straight pull.

These sleeves in the course of time become worn and consequently must be removed and much difficulty has been experienced in the removal of them and for the purpose of overcoming this difficulty the device herein above described has been provided.

What I claim is:

1. A sleeve puller including a tubular member, a rigid laterally projecting stud at one end thereof and adapted to engage with the sleeve to be pulled, and a wedge shaped member slidably mounted on said tubular member, and adapted to enter the side of the sleeve opposite the stud to secure said stud in engagement with the sleeve.

2. A sleeve puller including a tubular member, a lateral stud carried by, and rigid with, one end thereof, and adapted to engage with the sleeve to be pulled, a wedge gage slidably mounted on said member, and adapted to enter said sleeve opposite the stud to lock said stud in engagement with the sleeve, and a grip carried by the outer end of the wedge.

3. A sleeve puller including a tubular member, a lateral projection at one end thereof formed rigidly therewith, a handle at the other end of said member, through which the same may be turned, a wedge slidably mounted on said member, and adapted to enter the sleeve opposite the stud and by its wedging effect to lock said projection in engagement with the sleeve.

In testimony whereof I have signed my name to this specification in the presence of two subscribing witnesses.

JOSEPH H. WILSON.

Witnesses:
E. V. HARDWAY,
A. ALLEN.